July 16, 1929.  L. BROWN  1,721,202
PRINTER AND PROCESS OF PRINTING PHOTOGRAPHIC FILMS
Original Filed Sept. 13, 1922   5 Sheets-Sheet 4
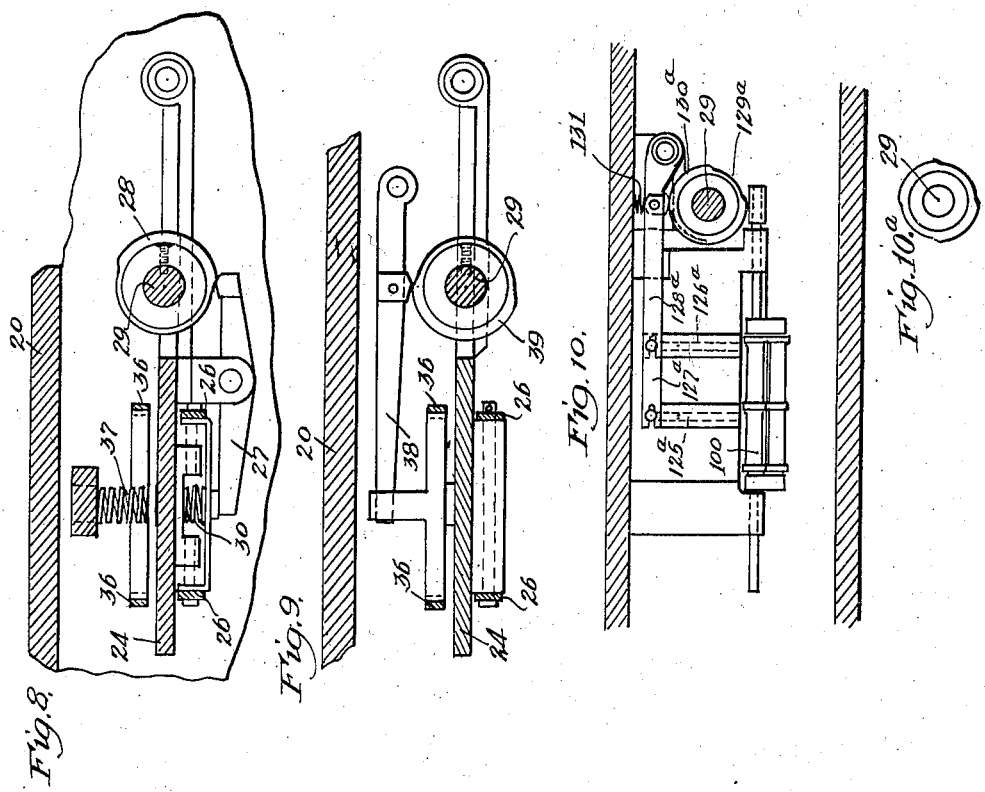
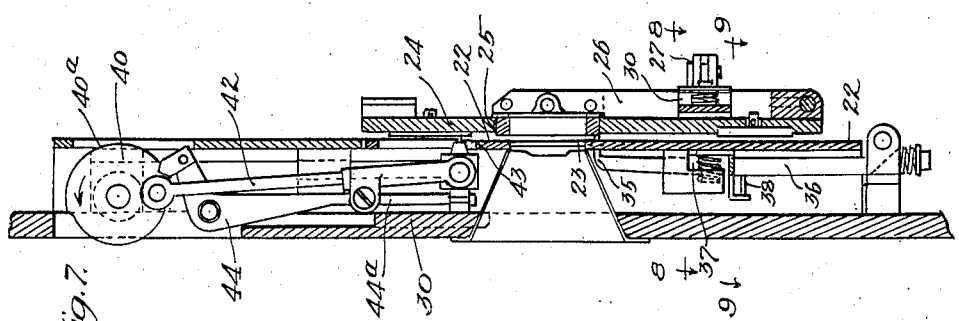
Inventor:
Lloyd Brown
By James T. Barkeley
his Attorney July 16, 1929.    L. BROWN    1,721,202
PRINTER AND PROCESS OF PRINTING PHOTOGRAPHIC FILMS
Original Filed Sept. 13, 1922    5 Sheets-Sheet 5
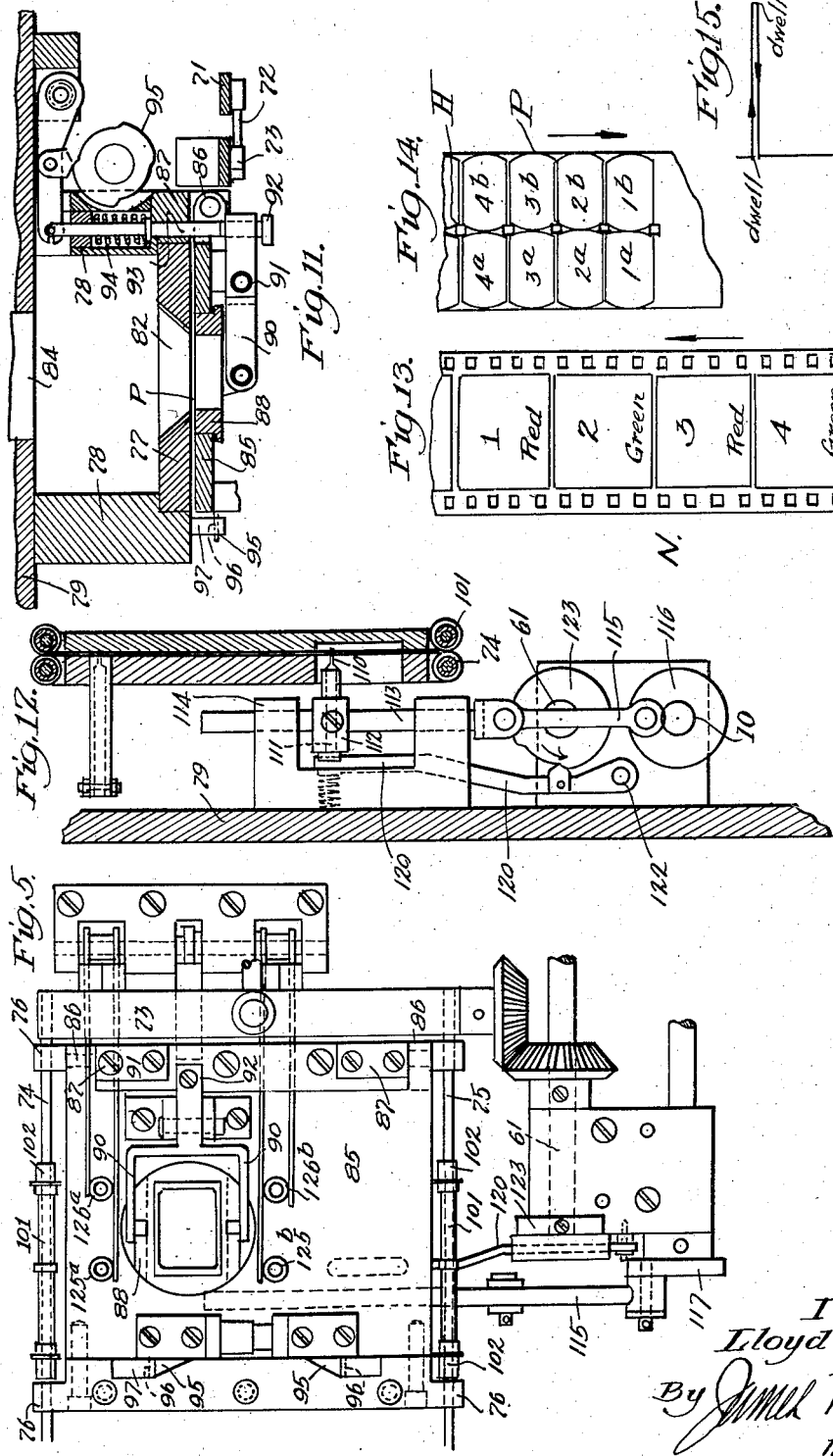
Inventor:
Lloyd Brown,
By James T. Burkelew
his Attorney Patented July 16, 1929.

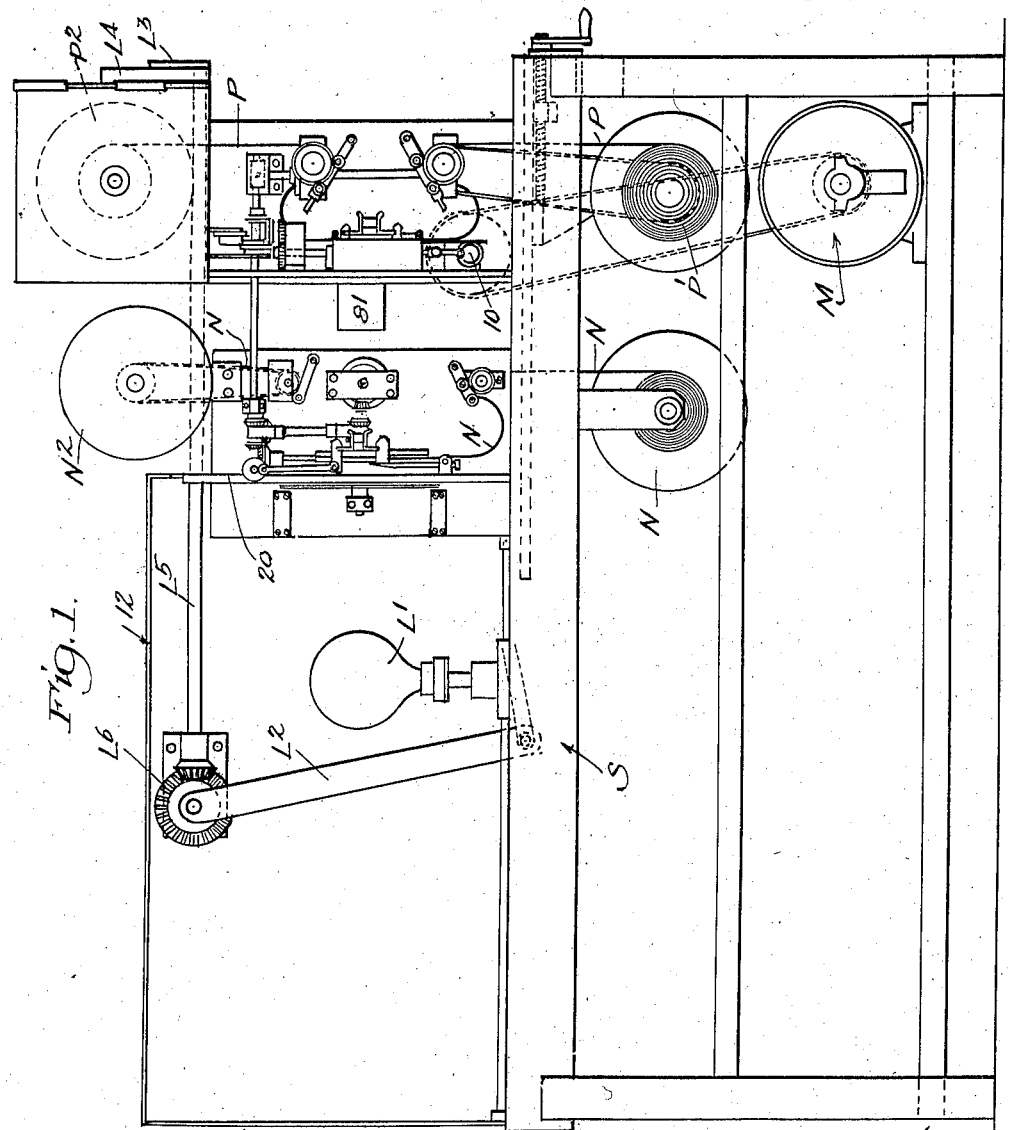

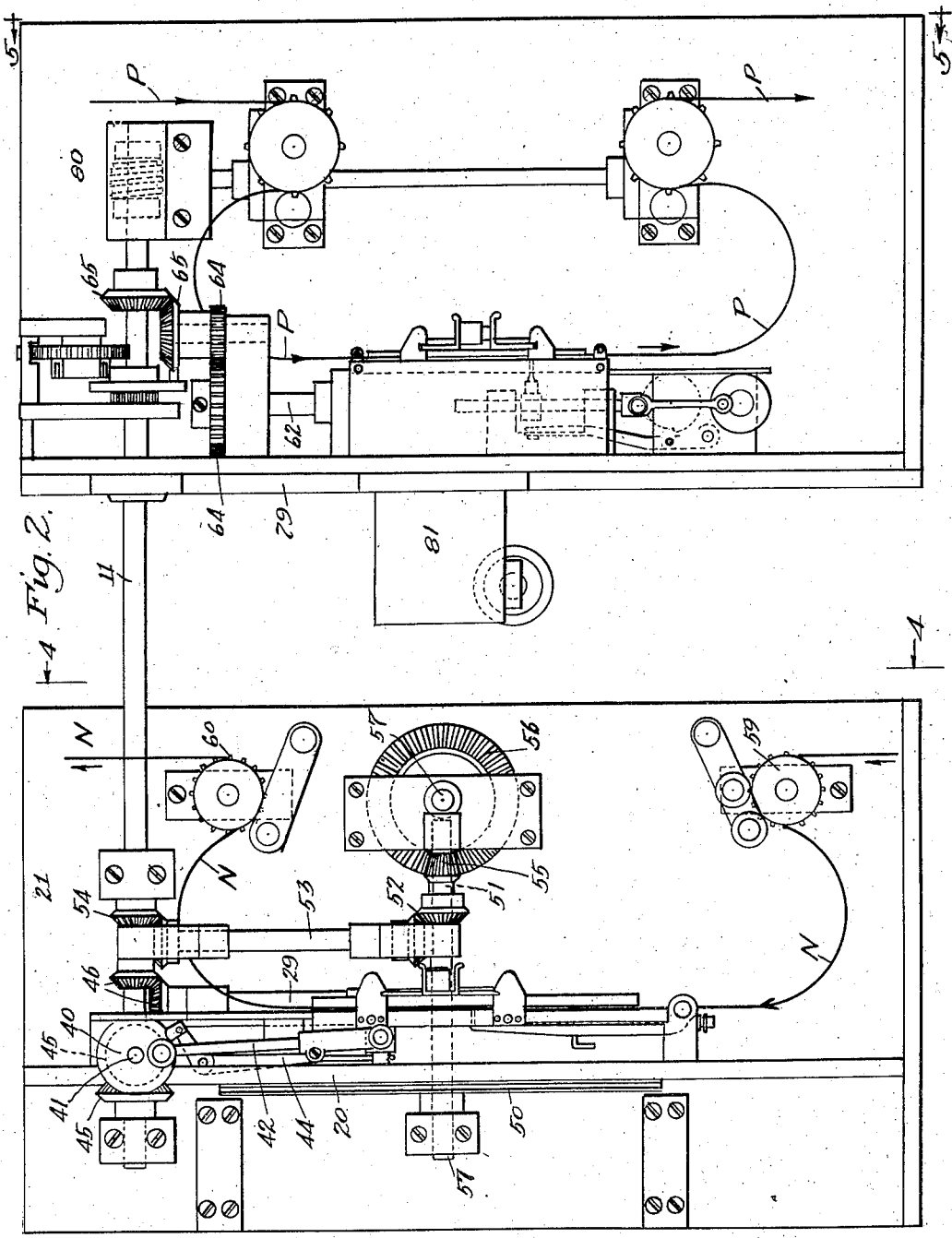

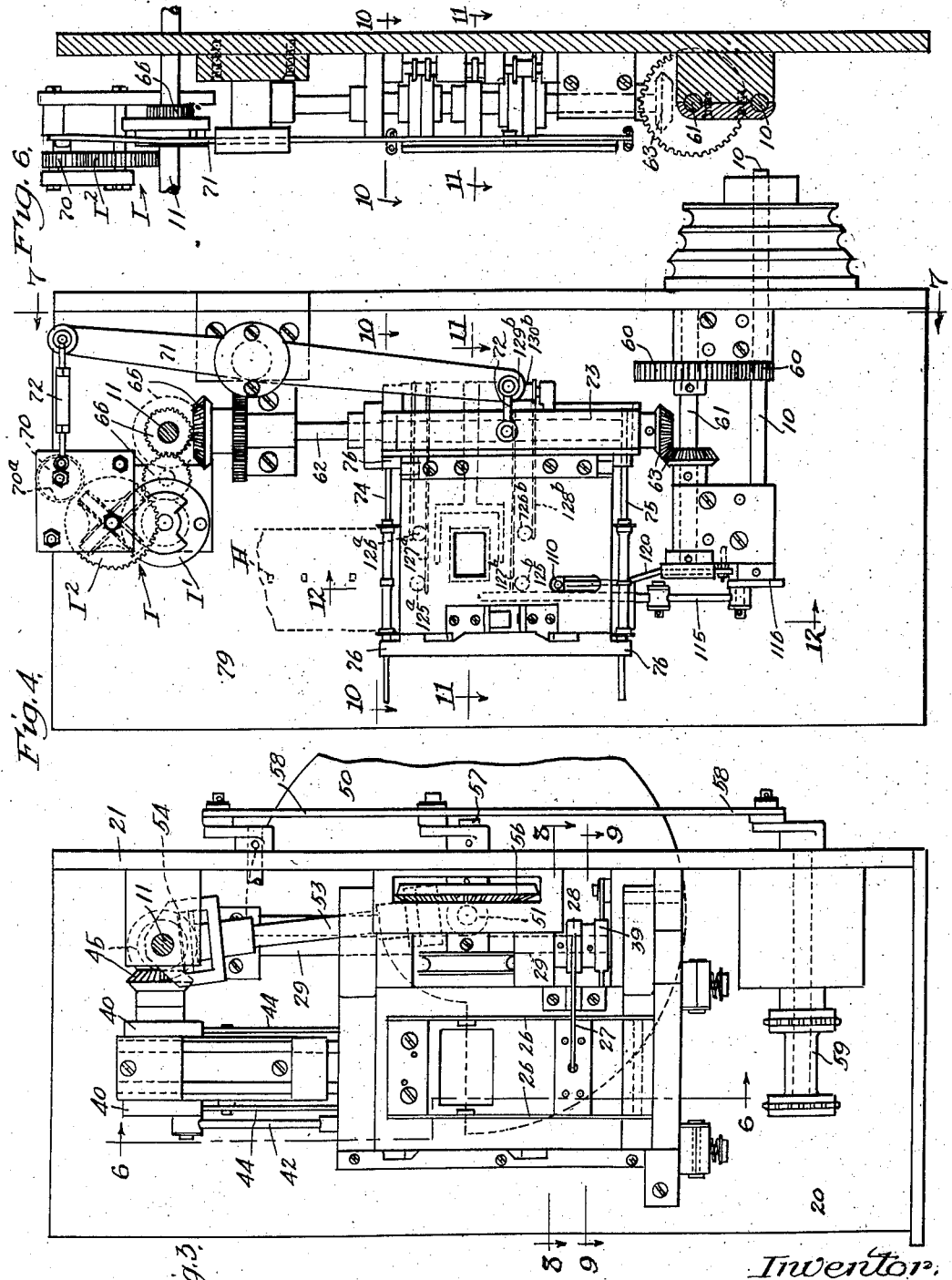

1,721,202

UNITED STATES PATENT OFFICE.

LLOYD BROWN, OF LOS ANGELES, CALIFORNIA, ASSIGNOR, BY MESNE ASSIGNMENTS, TO C. B. HURTT, W. F. PETERSON, GEORGE BAYNE STEPHENS, AND CATHERINE BAYNE STEPHENS, ALL OF LOS ANGELES, CALIFORNIA, AND G. A. STEPHENS, OF MOLINE, ILLINOIS, TRUSTEES.

PRINTER AND PROCESS OF PRINTING PHOTOGRAPHIC FILMS.

Application filed September 13, 1922, Serial No. 587,870. Renewed May 31, 1928.

This invention relates particularly to the printing of moving picture films; and particularly to the production of a film whereon the pictures or picture areas are arranged in two or more rows. In the printed film the pictures of the two or more rows may be arranged opposite each other or may be arranged in staggered relation. My invention relates to any such arrangement.

In the prior art it has been proposed to make motion picture film with two or more rows of pictures, with the pictures either in opposing or staggered relation. Such a film, for instance, is shown in my Letters Patent No. 1,344,616 dated June 29, 1920, and entitled Motion picture kinetograph and film. It has been proposed however, to take such pictures, in a suitably arranged camera, so that the original negative film itself has such a plurality of rows of pictures. For instance, a typical kind has had two rows of pictures, each picture being one-half the height and one-half the width of the picture as now used on standard film; so that in the standard picture space four pictures have been taken. For black and white pictures one advantage of such an arrangement is that the footage of film is reduced to one-quarter the standard footage, but the taking of such pictures has involved either the use of two lenses, or a shiftable lens or some mechanism for causing a relative lateral shift between the film and the lens. The use of two lenses has necessarily involved the problem of parallax. For color pictures it has been highly desirable, if not absolutely necessary, that the two pictures which are taken in complementary colors (through complementary color screens) should be taken simultaneously. This is explained in my copending application, Serial No. 404,146, filed August 17th, 1920 entitled Colored motion picture film. When a camera is arranged to take color pictures in this manner, parallax in a horizontal direction has been involved. Furthermore, in any such arrangement, whether for taking black and white pictures or color pictures, certain complications in the camera mechanism have been necessary.

It is a general object of this invention to provide a process and a machine for printing whereby the above mentioned difficulties are overcome, and whereby the standard type of negative film may be taken in a standard camera; or simultaneous color pictures through complementary color screens may be taken, with a simple attachment, in a standard type of camera, with the pictures arranged in the usual standard manner on a standard film; then that standard film may be put through my printing process to produce a positive projection film of the kind having two or more rows of small sized pictures. This arrangement not only greatly reduces complications in the cameras; but it also has the advantage that the final projected pictures have all of the clearness of definition that can be had in the larger sized standard negative picture images.

From an explanation of suitable mechanism the process itself will be readily understood; and accordingly I refer, for the purposes of the following illustrative description, to the accompanying drawings in which:

Fig. 1 is a side elevation of my improved printer.

Fig. 2 is an enlarged side elevation of the film moving parts of the printer.

Fig. 3 is a front elevation of part of the mechanism shown in Fig. 2, being a view taken substantially on the line 4—4 of Fig. 2.

Fig. 4 is a similar elevation of the other part of the mechanism shown in Fig. 2.

Fig. 5 is a detail elevation on an enlarged scale of a portion of the parts shown in Fig. 4.

Fig. 6 is a vertical section taken as indicated by the line 6—6 of Fig. 4.

Fig. 7 is an enlarged vertical section taken substantially on the line 7—7 of Fig. 3.

Fig. 8 is an enlarged horizontal section taken as indicated by lines 8—8 on Figs. 3 and 7.

Fig. 9 is a similar section taken as indicated by lines 9—9 on Figs. 3 and 7.

Fig. 10 is an enlarged horizontal section taken as indicated on line 10—10 of Figs. 4 and 6.

Fig. 10ᵃ is a detail view.

Fig. 11 is an enlarged horizontal section taken substantially on the lines 11—11 of Figs. 4 and 6.

Fig. 12 is an enlarged vertical section taken on the line 12—12 of Fig. 4.

Fig. 13 is a view showing the kind of negative film with which my process and mechanism work.

Fig. 14 shows the kind of positive film produced by my printing process.

Fig. 15 is a diagram showing the movement of the positive film.

Referring first to Figs. 13 and 14 I show there a standard film N having consecutive picture areas 1, 2, 3, etc.; and I also show a double row film P with the pictures arranged opposite each other in pairs as shown at $1^a$, $1^b$, $2^a$, $2^b$, $3^a$, $3^b$, etc. In this film P there is only a single line of sprocket holes H, the sprocket holes being arranged centrally of the film and at the adjacent corners of the pictures, as illustrated. This particular type of film is illustrated and described in my application, Ser. No. 462,660 filed April 19th, 1921, which has matured into Patent No. 1,485,907, dated March 4, 1924, and entitled Motion picture film; and I show it here because the particular mechanism which I shall describe here has been developed to use this type of film. However, it will be readily understood that the mechanism herein described, and the process of printing herein described, are not at all limited to the use of this particular type of film.

Supposing now that film N represents an ordinary black and white film in which the consecutive pictures 1, 2, 3, etc., are taken in the usual sequence; then my process involves printing the film N onto the film P so that picture area 1, for instance, of film N is reduced and printed to form picture area $1^a$ of film P, and so that the picture area 2 of film N is reduced and printed to form picture area $1^b$ of film P, and picture area 3 of film N is reduced and printed to form picture area $2^a$ of film P.

In other words, on film P the picture areas may run consecutively as follows: $1^a$, $1^b$, $2^a$, $2^b$, and so on. For black and white pictures it will be readily seen that the sequence on film P might as well be like this: $1^a$, $1^b$, $2^b$, $3^a$, $3^b$, and so on. On the other hand the first mentioned sequence may be preferable for color pictures as it keeps all of the pictures of one color value in one row and all the pictures of its complementary value in the other row. In making color pictures with this system the original film N will have picture area 1 in one color value and picture area 2 in the complementary color value and then have picture area 3 in the first mentioned color value, and so on. For instance, picture areas 1, 3, and so on will be in red color value, and picture areas 2, 4, and so on will be in red color value, and picture areas 2, 4, and so on will be in green color value.

In order to explain the mechanism I will now refer first to Figs. 1 and 2 and explain so much of the general features of the mechanism as will render the then following explanations of details more easily intelligible. The mechanism may be supported on a stand S, on which the driving motor M may be conveniently mounted, the motor driving up to a drive shaft 10 which happens to be, in the design of mechanism here shown, located in what for convenience I will term the positive film mechanism of the device—that is, the mechanism that handles the film on which the printing is being done. The negative film mechanism—the mechanism that handles the film from which the print is being made—is driven in synchronism with the positive film mechanism through the medium of interconnecting shaft 11. At 12 there is a light-box that supplies illumination for the negative film. I will use the terms "negative" and "positive" as applied to two films here to designate respectively the films from which the printing is being done and the film that is being printed; although it will be readily understood that it is not necessary that the film from which printing is being done be, strictly speaking, what is ordinarily known as a negative, in my process a negative can be printed from a positive as readily as a positive can be printed from a negative; but in the usual practice of the process the film that is being printed will be a positive film produced for purposes of projection, while the film that is being printed from will be a negative film made in a camera.

The positive film is shown at P, while the negative film is shown at N, positive film reels are shown at $P^1$ and $P^2$ and the negative film reels at $N^1$ and $N^2$. The positive film reels—the whole positive mechanism for that matter—may be enclosed in a light protecting casing; or the whole mechanism may be housed in a room illuminated with non-actinic light. The direction of movement of the two films is of no consequence, except that the direction of movement is, in practice, arranged in such a manner that the sequence of the pictures on the positive film is such as to get proper sequence of projection of those pictures when used in a projecting machine.

The lamp $L^1$ in the light box is adjustable longitudinally along slides, the adjustment being accomplished through the medium of a swinging arm $L^2$ connected to the base of the lamp, the arm being swingingly moved by manipulation of a pointer $L^3$ moving over dial $L^4$, a shaft $L^5$ and gears $L^6$ forming the connecting media.

The negative film mechanism (shown in Figs. 3, 4, 7, 8 and 9) needs but little explanation. There is an upright plate 20 that forms in effect the front end of the light box;

and this plate 20, together with another plate 21 set at right angles to plate 20 form the supporting framework for the negative film mechanism. Forward of plate 20 there is an aperture plate 22, having an aperture 23 in front of which there stands a film gate 24 with an aperture framed by the presser frame 25. This pressure frame 25 is pressed rearwardly, to hold the film between it and aperture plate 22, by a simple mechanism embodying two arms 26 connected with presser frame 25 and acted upon by a pivoted lever 27 which is actuated by a cam 28 on shaft 29; the cam being so formed as to move presser frame 25 to hold the film back flatly against aperture plate 22 during the periods of rest of the film and to release the film during its periods of movement. A spring 30 moves the frame 25 outwardly and causes the film to be freed when the cam is not moving the frame 25 rearwardly against the film. In order to register the film in proper position during its periods of rest, registration pins (claws) 35 are provided, mounted on the upper ends of arms 36; and these arms, pressed forward by a spring 37, are moved back at the proper time by a lever 38 actuated by a cam 39 also on shaft 29. The details of all these mechanisms need not be further explained; in fact these mechanisms may be made in a great variety of forms, as may also the film moving mechanism itself. Thus the film moving mechanism that I am about to explain is illustrative only. I use a film moving mechanism actuated from a combined crank and cam disk 40 on a shaft 41. The function of the connecting rod 42 is to move the film engaging pins 43 (Fig. 7) up and down, while the function of the cams 40ª of the disks 40, acting through the pivoted bell crank levers 44, is to move the film engaging pins 43 back and forth into and out of engagement with the film. The lower ends 44ª of the bell crank levers are formed as guides on which the pins 43 slide up and down. Shaft 41 is connected by gears 45 with shaft 11; and shaft 29 is connected with shaft 11 by gears 46. The shutter 50 is mounted on a shaft 51 driven by gears 52 from a connection shaft 53 which in turn is driven from shaft 11 by gears 54. A small gear 55 on shaft 51 also drives a gear 56 on shaft 57, which shaft, through interconnective means 58 drives the shafts of take-up sprockets 59 and 60. The gearing ratios are such, and the parts are all so relatively interconnected, that the shutter operates to illuminate the negative film during the periods of rest and when it is registered accurately in position and held flatly against the aperture plate.

The positive film mechanism is shown in detail in Figs. 4, 5, 6, 10, 11, and 12. The main drive shaft 10 drives, through gears 60, the horizontal shaft 61 that in turn drives a vertical shaft 62 through gears 63. This vertical shaft 62 is connected by spur gears 64 and beveled gearing 65 with shaft 11 to drive it. From shaft 11 an intermittent movement mechanism I (a Geneva movement) is driven through gears 66; and this intermittent movement mechanism I drives a small crank disk 70 intermittently through a half-revolution on each operation. A lever 71 is connected by connecting rods 72 with crank disk 70; and this lever is thus oscillated back and forth, but with a period of rest between its successive oscillations from one position to its opposite position. The function of this intermittent movement of the lever 71 is to move the positive film transversely, intermittently, at proper intervals, a distance equal to the distance between the centers of the two rows of picture areas. The lower end of lever 71 is connected by a short connecting rod 72 with a vertical member 73 that is secured at its upper and lower ends to horizontal slide rods 74 and 75 that slide horizontally in bearings 76 that project from the upper and lower corners of the race or aperture plate 77. This aperture plate 77 is mounted, by blocks 78, on the frame plate 79, which with plate 80 forms the supporting frame for the positive film mechanism.

Lens 81 is mounted on frame plate 79 directly back of aperture 82 in aperture plate 77. This lens is designed and adjusted to throw upon the positive film a reduced focused image of the illuminated image area in the negative film, the image thrown on the positive film being reduced to approximately one-half the dimensions of the image area in the negative film, and therefore reduced to one-quarter the superficial area.

The film gate 85 is hinged at 86 to hinge blocks 87 secured to one of the mounting blocks 78; and this film gate has in it an apertured presser frame 88 that is pressed inwardly to confine the film against aperture plate 77 around aperture 82, and is released to allow the film to move. The gate 85 carries an arm 90 pivoted at 91; and the end of that arm has an adjustable screw 92 against which operates a push-rod 93. This push-rod is pushed out by a spring 94 and is retracted by the action of a cam 95 on shaft 29, a pivoted cam following arm 96 being connected directly with the push rod 93. Cam 95 is so shaped, as will be apparent from Fig. 11, that the presser frame 88 is thus operated to press and hold the film twice during each revolution of shaft 29; and the periods during which the film is thus pressed and held between the periods when lever 71 is moving from one position to the other in its shifting movement. In other words the shifting movement of lever 71 comes at a time when the presser frame 88 is moved out and the film is released so that it can move transversely. Film gate 85 does not press against aperture plate 77, but is spaced from the aperture plate as clearly shown in Fig. 11, this spacing being maintained by the hinge mounting at 86 and by other suitable spacing means, as for instance, the gate locking device shown in Figs. 5 and and 11, which locking device has members 95 that set in notches 96 in projections 97 on one of blocks 78.

Now I have said before that the slide rods 74 and 75 are moved transversely by the shifting action of lever 71. These slide rods carry guide rollers 100 for guiding the film; and the other roller 101 of each set of guide rollers is carried in blocks 102 that are mounted on the rods 74 and 75; so that these sets of guide rollers move transversely with the slide rods 74 and 75. The film, indicated in dotted lines in Fig. 4, travels through these guide rollers and travels between the aperture plate 77 and gate 85.

In the particular machine here being described, the longitudinal movement of the film, which is downward in this particular case, only occurs when the film is in the position indicated in Fig. 4—that is, in what I will call the left hand position. In this position it will be seen that the right side of the film is in position to be exposed through aperture 82. The mechanism in Fig. 12 is shown just starting to move the film downwardly. This intermittent motion mechanism has a single claw 110 formed on the end of a claw pin 111 that can slide horizontally back and forth in a member 112 mounted on a vertically reciprocatory rod 113. This rod 113 is mounted in bearings 114 and is reciprocated by a connecting rod 115 from a small crank 116 mounted on the end of shaft 10; so that the claw 110 is constantly reciprocated up and down. However, the claw does not engage the film on every downward movement; but only on one downward movement out of every four. This functioning of the claw is caused by the operation of an arm 120 that engages the rear end of claw pin 11 and may be pressed forward by a suitable spring say as indicated at 121. This arm is pivoted at 122 and it is acted upon by a cam 123; and the cam 123 normally keeps the arm back and thus keeps claw 110 back out of any possibility of engaging the film. Cam 123 is mounted on shaft 61; and the ratio in gears 60 between the shafts 10 and 61 is one to four. Cam 123 thus revolves once for each four revolutions of crank 116; and the cam is so shaped that it lets the arm 120 move to the right in Fig. 12, and therefore lets the claw 110 move forward and into engagement with the film, only once during a revolution of the cam and only for the period of one downward movement of claw 110.

Now the gears at 64 are two to one gears; that is, the constantly rotating member $I^1$ of the intermittent movement I is rotated two revolutions for each revolution of shaft 62; and shaft 62 rotates at even speed with shaft 61. Consequently, the intermittently moving wheel $I^2$ of the intermittent mechanism is given two successive quarter turns for each rotation of shaft 61; and it will be remembered that the claw 110 engages the film only once for each rotation of shaft 61. Each intermittent one-quarter revolution of wheel $I^2$ moves the small crank disk 70 through a half-revolution, the ratio of the gear of $I^2$ and the gear $70^a$ being two to one. Consequently, for each revolution of shaft 61 and for each engagement of the film by claw 110 I get two opposite intermittent motions of the lever 71, first in one direction and then in the opposite direction, and consequently I also have two opposite horizontal transverse shiftings of the film P, first in one direction then in the opposite direction. In order to give a clear idea of the inter-relation of these motions, I will make the following statement: Starting with the film in its left hand position as indicated in Fig. 4, I will suppose that the claw 110 is now moving downwardly and is just starting to pull the film downwardly. I will say, for instance, that a picture has just been exposed. Then, at the end of the downward movement of the film, intermittent movement I acts to shift the film over to the right. At the end of this shifting movement to the right, the film will then be in a position to expose an area at its left side; for instance, the area shown at $1^a$ in Fig. 14. Fig. 15 shows diagrammatically the movement of the film. In this last mentioned position there is a dwell of the film and it is during this dwell that the shutter 50 operates to expose the negative film to the illuminating light and thus operate to cause an exposure to be made on the postive film. Then the intermittent mechanism operates to shift lever 71 again back to the position shown in Fig. 4 and to shift the film back to its left hand position; and then there is another dwell of the intermittent shifting mechanism. Then a picture area at the right hand side of the film, as for instance, picture area $1^b$ of Fig. 14 may then immediately be exposed and the next downward movement of the film then ensue; or the next downward movement of the film may take place immediately after the film has been shifted to the left and the exposure of $1^b$ takes place after the downward movement. Either sequence may be used; it is simply a question as to whether the exposure is before or after the downward movement. The dwell of the intermittent mechanism is long enough to allow the exposure and to allow claw 110 to move the film down. Then, after this exposure of picture area 1ᵇ with the film at its left hand position, and after the downward movement of the film, the intermittent shifting mechanism shifts again to the right, there is again a dwell during which the picture area 2ᵃ at the left of the film is exposed; then the intermittent shifting mechanism moves the film back to its left hand position and then as above explained picture 2ᵇ is exposed and another downward movement of the film takes place. It will be seen by this arrangement and system of movement that the film is always in its left hand position when it is moved downwardly by the claw 110. Consequently there is need for only one claw 110 to engage the single line of film perforations H, and that claw does not have to move transversely to follow the transverse shift of the film.

To register the film P in its proper position each time, during dwells and during the exposure periods, I have provided four registration pins, arranged in two pairs, 125ᵃ, 125ᵇ and 126ᵃ, 126ᵇ. Pins 125ᵃ and 125ᵇ are in such a position as to register with and enter the film perforations when the film is in its left hand position; while registration pins 126ᵃ and 126ᵇ are in such position as to register with and enter the film perforations H when the film is in its right hand position. These several pins are each operated by individual levers 127ᵃ, 127ᵇ and 128ᵃ and 128ᵇ, which levers are operated by cams on shaft 62, the cams being designated 129ᵃ, 129ᵇ and 130ᵃ, and 130ᵇ. Each of these cams allows its corresponding lever and its corresponding registration pin to move forward (they being pressed forward for instance, by a spring such as shown at 131) once only during each rotation of shaft 29; that is, once only during each rotation of shaft 61 and therefore once only for each complete cycle of movement of the whole film moving mechanism. But the cams are so arranged on shaft 29 that cam 130ᵃ allows pin 126ᵃ to move forward at one time (during the right hand dwell hereinbefore referred to) and cam 129ᵃ allows its corresponding registration pin 125ᵃ to move forward into engagement with the film during the left hand dwell of the film. It will be remembered that I have described that the film has two dwells for each rotation of shafts 61 and 62. Cams 129ᵇ and 130ᵇ are the same, and placed in the same arrangement on shaft 62, as cams 129ᵃ and 130ᵃ, respectively, which two last mentioned cams are shown in Fig. 10ᵃ, so that registration pins 125ᵃ and 125ᵇ are let forward into spaced film perforations simultaneously, and the same is true of pins 126ᵃ and 126ᵇ.

Having described a preferred form of my invention, I claim:—

1. The process of printing motion picture film from a negative in which consecutive pictures are arranged in a single line, that involves printing from the negative every other picture onto the positive in a line at one side of one face of the positive and printing from the negative the remaining pictures in a single line at the other side of the same face of the positive.

2. The process of printing motion picture film from a negative in which consecutive pictures are arranged in a single line, that involves producing and printing from the negative every other picture onto the positive in a line at one side of one face of the positive and producing and printing from the negative the remaining pictures in a single line at the other side of the same face of the positive.

3. The process of printing motion picture film from a negative in which consecutive pictures are arranged in sequence in a single line, that involves illuminating successive negative pictures and forming reduced images of said successively illuminated negative pictures, and exposing a positive film to said reduced negative images, the positive film being exposed first at one side of one face to one such image and next at the opposite side of the same face to a next succeeding image.

4. The process of printing motion picture film from a negative in which consecutive pictures are arranged in sequence in a single line, that involves illuminating successive negative pictures and forming reduced images of said successively illuminated negative pictures, placing a positive film at the focal plane of one so-formed image in such position that the image falls on the positive film at one side thereof, and then moving the positive film transversely so that the next succeeding so formed image falls upon the positive film at the opposite side thereof, and then moving the positive film longitudinally.

5. The process of producing a color motion picture film that involves first the production of a negative with pictures arranged in a single row and in simultaneously exposed pairs, the pictures of each pair being exposed to different color values, and thus representing different color values; then printing from such negative onto a positive and arranging the resultant images on one and the same face of the positive in two rows with the paired pictures one in one row and the other in the other row.

6. The process of producing a color motion picture film that involves first the production of a negative with pictures arranged in a single row and in simultaneously exposed pairs, the pictures of each pair being exposed to different color values, and thus representing different color values; then printing from such negative onto a positive and arranging the resultant images on one and the same face of the positive in two rows with the paired pictures one in one row and the other in the other row and opposite each other.

7. The process of producing a color motion picture film that involves first the production of a negative with pictures arranged in a single row and in simultaneously exposed pairs, the pictures of each pair being exposed to different color values, and thus representing different color values; then printing from such negative onto a positive and arranging the resultant images on one and the same face of the positive in two rows with the paired pictures one in one row and the other in the other row and with the pictures representing one color value entirely in one row and those representing the other color value entirely in the other row.

8. The process of producing color motion picture film, that involves exposing a negative film to form a single row of pictures thereon, with pictures in simultaneously taken pairs and those of each pair representing different color values; consecutively illuminating the negative pictures in their position sequence and forming reduced images of the successively illuminated negative pictures; and exposing a positive first at one side thereof to the image of one picture of a negative pair, and then at the other side thereof to the image of the other picture of a negative pair.

9. A printer embodying mechanism for intermittently moving and illuminating and forming an image of consecutive pictures of a standard negative film; an aperture plate having an aperture on which the so-formed images are thrown, means to guide a positive film of twice the width of said aperture past said aperture, intermittently acting mechanism to move said film longitudinally past said aperture, and intermittently acting mechanism to shift said film laterally back and forth so as to expose first one side of said film at said aperture and then the other side of said film at said aperture.

10. A printer embodying mechanism for intermittently moving and illuminating and forming an image of consecutive pictures of a standard negative film; an aperture plate having an aperture on which the so-formed images are thrown, means to guide a positive film of twice the width of said aperture past said aperture, intermittently acting mechanism to move said film longitudinally past said aperture, intermittently acting mechanism to shift said film laterally back and forth so as to expose first one side of said film at said aperture and then the other side of said film at said aperture, and means to register said film in the position to which it is intermittently moved and shifted.

11. The process of producing a motion picture film that involves first the production of a negative with pictures arranged in a single row and in simultaneously exposed pairs; then printing from such negative onto a positive and arranging the resultant images on one and the same face of the positive, the positive in two parallel rows with the paired pictures one in one row and the other in the other row.

In witness that I claim the foregoing I have hereunto subscribed my name this 27th day of July, 1922.

LLOYD BROWN.